Oct. 18, 1938.  W. L. SMITH  2,133,489
GYROSCOPE
Filed Dec. 6, 1933  2 Sheets-Sheet 1
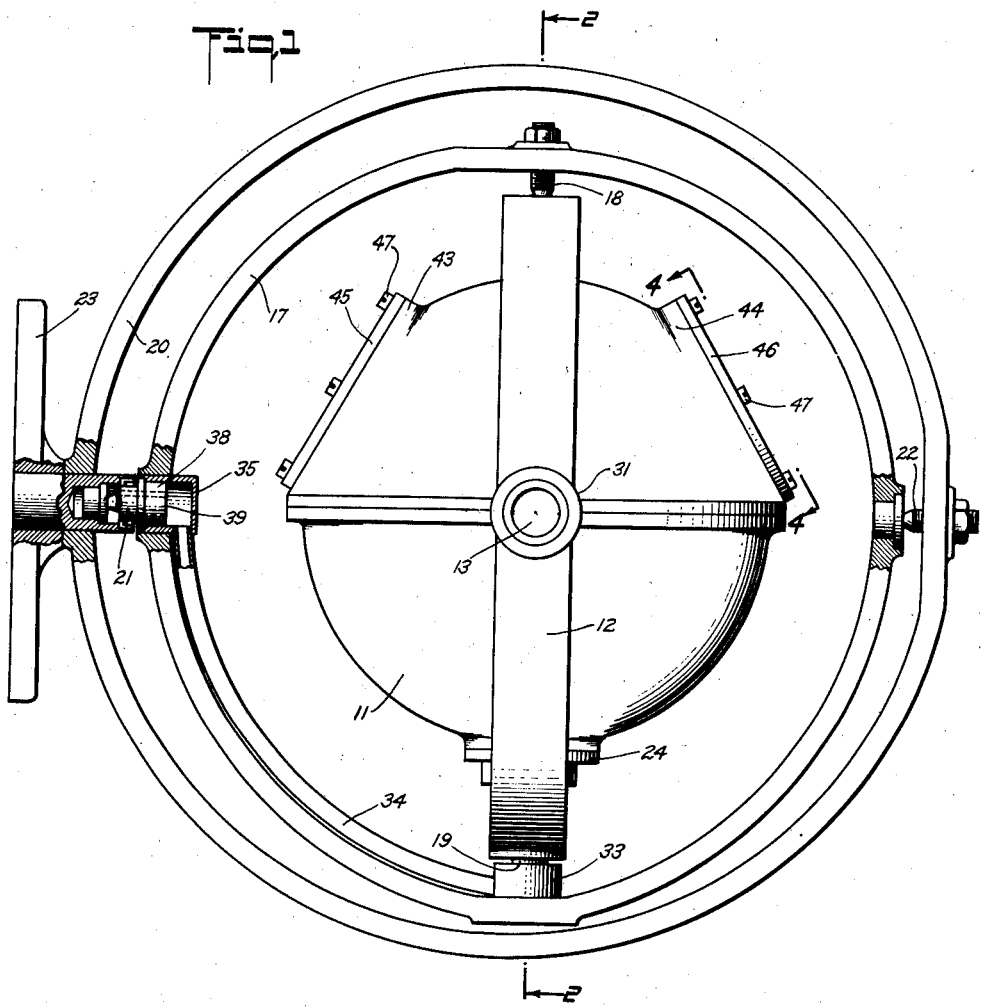
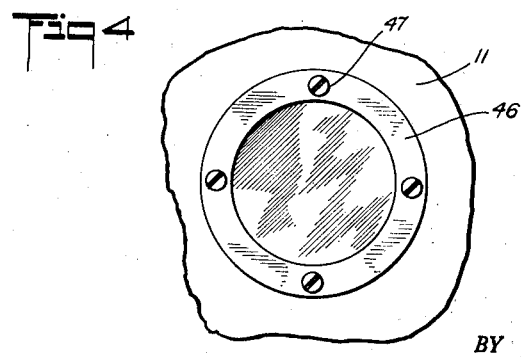
INVENTOR.
WESLEY L. SMITH.
BY Stephen Cerstvik
ATTORNEY.

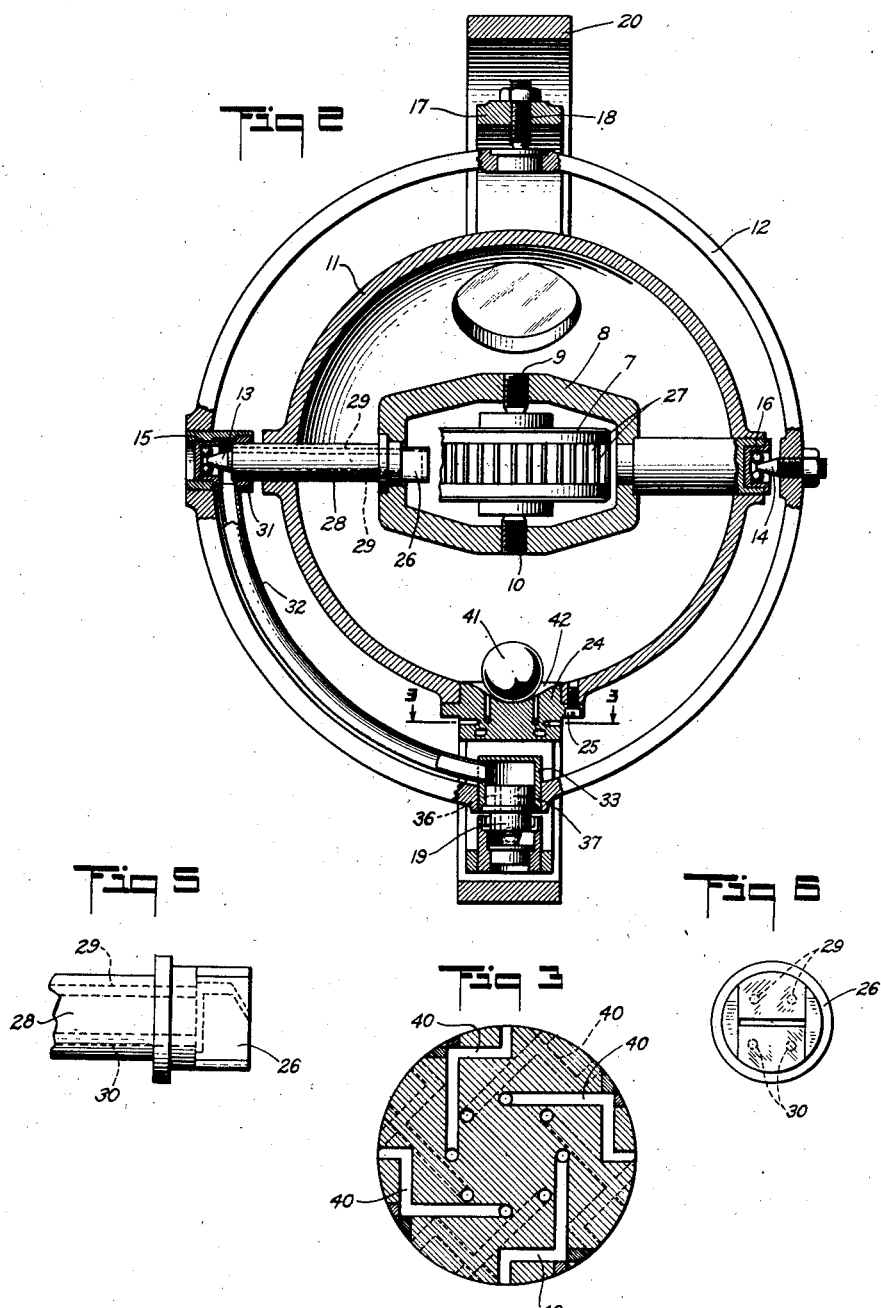

Patented Oct. 18, 1938

2,133,489

UNITED STATES PATENT OFFICE 2,133,489

GYROSCOPE

Wesley L. Smith, Cranford, N. J., assignor to Eclipse Aviation Corporation, East Orange, N. J., a corporation of New Jersey Application December 6, 1933, Serial No. 701,201

16 Claims. (Cl. 74—5)

The present invention relates to gyroscopes and, more particularly, to gyroscopic devices which are adapted to be employed on aircraft for establishing and maintaining a fixed reference line or plane thereon.

Various devices of this type have been provided heretofore, wherein a small simple pendulum is universally suspended from a gyro-pendulum and is effective, upon relative movement between it and the gyro-pendulum, to produce air jet reactions for applying a torque to the gyro-pendulum thereby damping the latter against disturbing forces, such as accelerations, acting thereon. In these devices, however, the simple pendulum is limited in the extent of its relative angular movement and, therefore, when such devices are mounted on aircraft, the damping means are effective only through relatively small angles of inclination of the aircraft about its longitudinal and transverse axes and are wholly ineffective when the aircraft is performing violent manœuvres, this being due largely to the fact that the gyro-pendulum is pendulous at all times, and, therefore, always subject to disturbances by acceleration forces which cannot be completely counteracted by the small pendulum-controlled damping means beyond a certain angular displacement between the small pendulum and the gyro-pendulum.

The limited operation of the damping means of such prior art devices is also due to the fact that the simple pendulum is associated with a plurality of air ports or ducts in such a manner that when relative movement takes place between the simple pendulum and the gyro-pendulum, the former uncovers one or more ports on one side of the vertical axis of the gyro-pendulum while it covers a corresponding number of ports on the opposite side of the vertical axis of the pendulum. Therefore, when the simple pendulum is in the extreme angular position to which it is permitted to move, one or more ports on one side of the axis of the gyro-pendulum will be completely uncovered while those on the other side will be completely covered, thereby causing a torque to be applied to the gyro continuously in one direction only so that the gyro-pendulum continues to precess until the rotor axis is no longer vertical.

Accordingly, one of the objects of the present invention is to provide novel means whereby the foregoing difficulties are eliminated and the gyroscope damped effectively when used as a gyro-pendulum, even when the aircraft on which it is mounted is performing violent manœuvres.

Another object is to provide a novel gyroscopic device having a universally mounted gyroscope spinning about a vertical axis for establishing and maintaining a fixed horizontal reference plane, including novel means whereby the device is normally pendulous when no disturbing forces are acting or when only relatively small disturbing forces are acting, said means being effective to produce a correcting torque on the gyroscope when said small forces are acting, and whereby said means are ineffective to produce a correcting torque on the gyroscope when relatively large forces are acting on the gyroscope so that the latter becomes, in effect, a gyroscope rigidly fixed in space.

A further object is to provide a novel gyroscopic device including a universally mounted non-pendulous closed housing wherein a gyroscope is mounted for rotation about a vertical axis, and novel damping means including a ball within said housing adapted for unlimited free rolling movement therein along a path defined by the interior curved surface of the housing, whereby said gyroscope and housing are made pendulous and said ball is effective to cause said damping means to produce a correcting torque on the gyroscope when the latter is disturbed by relatively small forces, and whereby said damping means are rendered ineffective to produce a correcting torque on the gyroscope when disturbing forces acting thereon are relatively large and above a predetermined magnitude.

A still further object of the invention is to provide novel means for a gyroscope whereby the latter is made pendulous to establish a fixed horizontal reference plane when the gyroscope is mounted on an aircraft and the latter is stationary on the ground, and whereby said gyroscope is damped against disturbing forces, such as accelerations, when the aircraft is in flight and the forces are relatively small so that the reference plane is maintained, and whereby no correcting torques are produced thereon when the acceleration forces are relatively large and above a predetermined magnitude so that the reference plane is continued to be maintained even when the aircraft is performing violent manœuvres.

Still another object is to provide novel means for making a universally mounted vertical gyroscope pendulous so that the gyroscope may precess about two mutually perpendicular horizontal axes and for causing a torque to be applied to said gyroscope in either direction about either or both of said axes and at right angles to the direction of acceleration forces acting on the gyroscope when said forces are relatively small, and for causing torques to be applied to the gyroscope simultaneously in all directions about both of said horizontal axes when the forces are relatively large and above a predetermined magnitude whereby no effective correcting torque is produced on said gyroscope so that its vertical spinning axis will remain fixed in space.

The above and other objects and advantages of the invention will appear more fully hereinafter from a consideration of the detailed description which follows, taken in connection with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views:

Fig. 1 is an elevational view of a gyroscope embodying the present invention;

Fig. 2 is a vertical section taken on line 2—2 of Fig. 1;

Fig. 3 is a cross-section taken on line 3—3 of Fig. 2 showing a portion of the novel damping means embodying the invention;

Fig. 4 is a partial view of the gyro housing as viewed along the line 4—4 of Fig. 1;

Fig. 5 is a detailed view of the nozzle for directing an air jet against the periphery of the gyro-rotor, as viewed looking upward from the bottom of Fig. 2; and Fig. 6 is a view of the nozzle as seen from the right of Fig. 5.

It has been previously pointed out that, although the damping means of prior art devices of the class described functioned satisfactorily when mounted on an airplane and acted on only by acceleration forces occurring due to changes in speed of the airplane in level flight or in descent within a limited angle of inclination of said airplane, they were ineffective to properly control the gyro-pendulum when the airplane was manœuvred violently as, for example, when performing acrobatics which must be performed by flighting planes. This for the reason that the damping means of such prior art gyro-pendulums consisted of a small simple pendulum or a plurality of such pendulums suspended from the gyro-pendulum but having a restricted angular movement with respect to the gyro-pendulum so that when disturbing forces of very large magnitude operated the damping means, the simple pendulum or pendulums moved to their limit and produced a torque only in one direction and about one axis of the gyroscope and the gyro-pendulum continued to precess until the rotor axis was no longer vertical. By means of the present invention, such detrimental effect is eliminated by virtue of the fact that the damping means comprise a mass or weight constituted by a ball having unlimited free rolling movement in all directions so that when disturbing forces above a certain magnitude occur in all directions about the axis of the gyroscope, torques are applied simultaneously in all corresponding directions perpendicular to the respective directions of the extraneous or disturbing forces, thus producing no effective correcting torque and leaving the gyroscope undisturbed with its spinning axis always vertical.

Referring now to the drawings and, more particularly, to Figs. 1, 2, and 3, the novel gyroscope embodying the present invention comprises, as illustrated, a gyro-rotor 7 which is mounted for rotation about a vertical axis in a frame 8 by means of bearing pivots 9 and 10. The rotor 7 and its frame 8 are mounted in a substantially spherical casing 11 which is carried in a gimbal ring 12 for pivotal movement about a horizontal axis by means of pivots 13 and 14 and ball bearings 15 and 16 and for pivotal movement about another horizontal axis perpendicular to the axis of pivots 13 and 14 by means of another gimbal ring 17 in which the ring 12 is pivoted by means of pivots 18 and 19, the ring 17 being in turn pivoted in a third ring 20 by means of pivots 21 and 22. The ring 20, however, is rigidly carried by a fixed support 23 which may be a fixed part of the vehicle on which the gyroscope is to be mounted such, for example, as an aircraft. The casing 11 and rotor 7 are so constructed and arranged as to be practically balanced and substantially non-pendulous until the novel damping control means of the invention are associated therewith and then only at desired times as will appear later, said control means being adapted to cooperate with a member 24 (Fig. 2) secured to and within the bottom of the casing 11 in any suitable manner as by means of screws 25 and having a special construction for a purpose which will appear hereinafter.

It will thus be seen that the rotor 7 is arranged for rotation about a vertical axis 9, 10 and is mounted for relative angular movement about two horizontal axes mutually perpendicular to each other, namely axes 13, 14 and 21, 22 and when the casing is made pendulous, as will appear later, will remain vertical unless disturbed by acceleration forces acting at right angles to the axis 13, 14 and 21, 22, thereby establishing a fixed horizontal reference plane.

Means are provided for driving the rotor 7 on its axis 9, 10 and, in the form shown, comprise an air drive constituted by a nozzle 26 for directing a jet of air against a series of turbine buckets 27 provided on the periphery of the rotor 7. The nozzle 26 is secured in the frame 8 and also projects therefrom in the form of a cylindrical member 28 which is rigidly secured in the casing 11 and the outer end of which constitutes the pivot 13. The member 28 is provided with a pair of passages 29 and 30 extending horizontally therethrough and terminating in a chamber provided by a hollow coupling member 31 carried by the ring 12 and in which the ball bearing 15 is carried. Connected to the chamber of member 31 is a pipe 32 which extends to the interior of another hollow member 33 carried by the ring 12 at the bottom thereof and in which the vertical pivot 19 is mounted. Another pipe 34 (Fig. 1) is provided, one end of which is connected to the interior of member 33 and the other end to the interior of a similar member 35 carried by the ring 17 and in which is located the pivot 21. The pivots 19 and 21 each have a pair of passages 36, 37 and 38, 39, respectively, in order to provide a continuous passage from the pipe 32 to the hollow coupling member 35. There is thus provided a conduit system from the member 35 to the nozzle 26 so that air may be passed therethrough and directed by the nozzle 26 against the buckets 27 on the rotor 7. Any suitable source of air pressure may be provided for this purpose. A pressure pump may be connected to the member 35 in any suitable manner so that the air passes through the pipe 34, member 33, pipe 32, member 31, passages 29 and 30 and out through the nozzle 26. As the air is discharged from the buckets 27, it is exhausted to the exterior of the casing 11 through a plurality of ducts 40 provided on the member 24 and which lead first vertically through said member, as shown in Fig. 2, and then transversely in several horizontal directions to openings arranged circumferentially around the exterior of said member 24 so that the exhausted air emerges from the plurality of ducts in several directions spaced angularly in a horizontal plane perpendicular to the axis 9, 10. The ducts 40 are all of an equal size as are the openings around the periphery of the member 24 so that the reactions of all the air jets issuing from said openings are equal in all directions, thereby producing no resultant reaction on the casing 11 and, hence, causing no correcting torque to be applied to the gyro-rotor 7.

The means mentioned hereinbefore are now provided for making the rotor 7 and casing 11 pendulous and for damping the gyro-pendulum thus produced, i. e., for preventing precession of the axis 9, 10 of the rotor 7 due to acceleration forces or other disturbing forces acting in directions perpendicular to the axes 13, 14 and 21, 22. Said means are constructed and arranged in such a manner that a torque is applied to the gyroscope in either direction about either of said axes and at right angles to the disturbing forces when the latter are relatively small but whereby torques are applied on the gyroscope simultaneously in all directions about both of said axes when the acceleration or disturbing forces are of relatively large magnitude and exceeding a predetermined maximum, thereby producing no effective correcting torque about either axis in order that the gyroscope will remain undisturbed. In other words, when the forces are of relatively large magnitude, the gyroscope is no longer a gyro-pendulum but becomes a gyroscope which is rigidly fixed in space, and, hence, is undisturbed by any acceleration forces, thereby making it unnecessary to apply any correcting torques thereto. In the form shown, said means comprise a free mass or weight in the form of a solid sphere 41 (Fig. 2) which is adapted to be seated in a cup-shaped recess 42 provided at the top of member 24 within the casing 11, said recess having such a contour that when the ball 41 rests therein in covers one-half of each of the top openings of the ducts 40, thereby permitting equal amounts of air to pass from the inside of the casing 11 through the ducts 40 and out through the duct openings on the periphery of the member 24. Thus, as long as the ball 41 or the gyroscope is undisturbed by any acceleration or other forces, or the gyroscope is not moved about either of the two horizontal axes, jets of air having an equal force emerge from the peripheral openings of the ducts and so produce no torque on the gyroscope which, at this time, constitutes a gyro-pendulum due to the weight of the ball added to the weight of the bottom of the casing 11. If the ball 41 is caused to roll slightly within the cup-shaped recess 42 by a disturbing force or forces or by movement of the gyroscope about either of the horizontal axes, said ball will close partially or completely one or more of the top openings of the ducts and uncover, to a greater or lesser extent, those openings from which the ball is rolling, and will cover one or more of the openings toward which it is rolling, thereby causing a greater amount of air to pass from those ducts which are uncovered and a lesser amount or none at all from those which are covered and, hence, causing a reaction in a direction opposite to that from which a greater amount of air is ejected when only one duct is uncovered or in a direction which is a resultant of those jets which issue from the ducts that are open to a greater extent than the remaining ducts when several are uncovered. The depth of the cup-shaped recess 42 is so proportioned that, when the disturbing forces or the movements of the gyroscope exceed a predetermined magnitude, the ball 41 is caused to roll completely out of the recess thereby clearing all of the ducts to produce equal reactions in all directions in a horizontal plane perpendicular to the axis 9, 10 of the rotor 7, thus causing no effective torque to be applied to the gyroscope, i. e., when the ball 41 is displaced completely from the recess 42, it will roll along the inside surface of the casing 11. As soon as the forces cease, the ball 41 will roll back again and seat itself in the recess 42, thereby making the gyroscope and its casing pendulous again and will operate to produce the necessary correcting torque on said gyroscope when forces below the predetermined maximum are acting on said gyroscope. Although the casing 11 has been shown substantially spherical, the contour thereof may be so selected as to obtain the best results, i. e., the lower part of the interior surface of the casing may have a greater or smaller radius of curvature in order that the ball 41 may roll therealong more readily and quickly, depending upon the magnitude of the forces for which it is desired to make the damping means ineffective. If it be desired that the ball 41 be displaced from the recess 42 by a different predetermined force, all that is necessary is to provide a ball having a different radius of curvature, i. e., a lesser or greater radius of curvature depending upon whether it is desired to have a greater or lesser acceleration force move the ball 41 out of its recess. For this purpose, the casing 11 is provided with two flattened circular portions 43, 44 in the upper part thereof on opposite sides of the ring 12, which form circular openings into the casing which are covered by means of transparent cover plates 45, 46 respectively, secured to the casing by means of screws 47. The same result may be obtained by changing the radius of curvature of the recess 42 in which the ball is normally seated.

From the foregoing, it will be seen that, upon the disturbance of the gyroscope by any force, such as acceleration, below a predetermined value, or upon a limited angular movement of the gyro and casing about either of the horizontal axes, the ball 41 will roll slightly within the recess 42, thus producing a reaction by the air jets issuing from the peripheral openings of the ducts 40 in a direction such that the reaction will cause the rotor axis 9, 10 to precess back into the normally vertical position. If, however, the disturbing forces or the movements of the gyro are above a predetermined magnitude, as when an aircraft is put into a violent manoeuvre, the ball 41 will be displaced from the recess, thereby producing equal reactions in all directions, thus causing no effective torque to be applied to the gyroscope and, hence, leaving the rotor axis 9, 10 undisturbed and rigidly fixed in space in a vertical position.

Although only one embodiment of the invention has been illustrated and described, it will now be apparent to those skilled in the art that various changes and modifications may be made in the form and in the relative arrangement of the parts without departing from the scope of the invention. Reference is, therefore, to be had to the appended claims for a definition of the limits of said invention.

What is claimed is:

1. In combination, a non-pendulous casing mounted for relative angular movement about two mutually perpendicular horizontal axes and having a regularly curved interior surface at its lower portion below said axes, a gyro rotor, means supporting said rotor in said casing for rotation about a vertical axis perpendicular to said horizontal axes, a weighted mass in said casing and normally seated in the bottom part thereof whereby said casing is made pendulous, said mass being adapted to roll along the interior curved surface of said casing when acceleration forces above a predetermined magnitude act on said casing, and means cooperating with said mass when normally seated during the period that acceleration forces are below said predetermined magnitude whereby a torque is applied to said casing about either of said horizontal axes for damping said casing when the same is pendulous and the acceleration forces are below said predetermined magnitude.

2. In combination, a substantially non-pendulous spherical casing mounted for relative angular movement about two mutually perpendicular horizontal axes passing substantially through the center of said casing, a gyro rotor, means supporting said rotor in said casing for rotation about a vertical axis perpendicular to said two horizontal axes, a weighted ball in said casing and normally seated in the bottom thereof whereby said casing is made pendulous, said ball being adapted to roll along the interior spherical surface of said casing when acceleration forces above a predetermined magnitude act on said casing, and means providing fluid pressure passages controlled by said ball when normally seated during the period that acceleration forces are below said predetermined magnitude whereby a torque is applied to said casing about either of said horizontal axes for damping said casing when the same is pendulous and the acceleration forces are below said predetermined magnitude.

3. In combination, a non-pendulous casing mounted for relative angular movement about two mutually perpendicular horizontal axes and having a regularly curved interior surface at least at its lower portion below said axes, a gyro rotor, means supporting said rotor in said casing for rotation about a vertical axis perpendicular to said horizontal axes, a weighted ball in said casing and normally seated in the bottom thereof whereby said casing is made pendulous, said ball being adapted to roll along the interior curved surface of said casing when acceleration forces above a predetermined magnitude act on said casing, and means cooperating with said ball when normally seated during the period that acceleration forces are below said predetermined magnitude whereby a torque is applied to said casing about either of said horizontal axes for damping said casing when the same is pendulous and the acceleration forces are below said predetermined magnitude.

4. In combination, a gyroscope comprising a gyro rotor and rotor-bearing casing, means supporting said rotor for precessional movement about two mutually perpendicular horizontal axes and in substantially neutral equilibrium, said rotor having a normally vertical spin axis, means for making said gyroscope pendulous, and means controlled by said first named means to produce a force for applying a torque to said gyroscope about either of said horizontal axes when said gyroscope is pendulous and relatively small forces are acting thereon, said first named means being rendered completely ineffective to control said torque applying means when said acceleration forces exceed a predetermined magnitude.

5. In combination, a gyroscope comprising a gyro rotor and rotor bearing casing, means supporting said rotor for precessional movement about two mutually perpendicular horizontal axes and in substantially neutral equilibrium, said rotor having a normally vertical spin axis, means for making said gyroscope pendulous, and means providing air passages controlled by said first named means to produce air jets for applying a torque to said gyroscope about either of said horizontal axes when said gyroscope is pendulous and relatively small forces are acting thereon, said first named means being rendered completely ineffective to control said air passages when said acceleration forces exceed a predetermined magnitude.

6. In combination, a gyroscope comprising a gyro rotor and rotor bearing casing, means supporting said rotor for three degrees of freedom in substantially neutral equilibrium, means for making said gyroscope pendulous, and means controlled by said first named means to produce a force for applying a torque to said gyroscope when the latter is pendulous and relatively small acceleration forces are acting thereon, said first named means being rendered completely ineffective to control said torque applying means when the acceleration forces exceed a predetermined magnitude.

7. The combination with a gyroscope, of means including a single weight only brought into action by a disturbing force of limited magnitude acting on the gyroscope to produce a force for causing a torque to be applied to said gyroscope but completely ineffective to cause a torque to be applied to said gyroscope when said disturbing force exceeds said limited magnitude.

8. The combination with a gyroscope, of means including a single weight only brought into action by a limited angular movement of said gyroscope about an axis to produce a force for causing a torque to be applied to said gyroscope about a second axis thereof but completely ineffective to cause a torque to be applied to said gyroscope when the movement thereof exceeds said limited movement.

9. The combination with a gyroscope having a rotor mounted for rotation about one axis and for precession about two other axes perpendicular to each other and to said axis of rotation, of means including a single weight only brought into action by a disturbing force of limited magnitude acting on said gyroscope about either of the two second-mentioned axes to produce a force for causing a torque to be applied to said gyroscope but ineffective to cause a torque to be applied to said gyroscope about either of said two second-mentioned axes when said disturbing force exceeds said limited magnitude.

10. The combination with a gyroscope having a rotor mounted for rotation about one axis and for relative angular movement about two other axes perpendicular to each other and to said axis of rotation, of means including a single weight only brought into action by limited angular movement of said gyroscope about either of said two second-mentioned axes to produce a force for causing a torque to be applied to said gyroscope about the other of said two second-mentioned axes but ineffective to cause a torque to be applied to said gyroscope about either of said two axes when the angular movement of said gyroscope exceeds a predetermined magnitude.

11. In combination, a gyro rotor having a normally vertical spin axis, a casing, means mounting said rotor in said casing, means mounting said casing for universal movement about mutually perpendicular horizontal axes, means providing a plurality of oppositely directed orifices through which air may be discharged from said casing, and rolling valve means actuated in accordance with the direction of inclination of the spin axis of said gyro rotor when it departs from the normal vertical for regulating the discharge of air through said orifices.

12. In combination, a gyro rotor having a normally vertical spin axis, a casing, means mounting said rotor in said casing, having an air inlet for driving said rotor and also having means providing air discharge orifices through which the air from said rotor may be discharged, and a ball valve for opening and closing said discharge orifices upon inclination of the gyro spin axis from its normally vertical position whereby, upon departure of the gyro rotor axis from the true vertical and in accordance with the direction of tilt of said spin axis, said ball valve rolls to determine which of said orifices will emit the air supplied thereto, thereby to apply a precessing torque on the gyro rotor by the resulting unbalanced air jet emerging therefrom.

13. In combination, an air-tight casing, a gyro rotor, means for mounting said rotor in said casing, and valve means communicating the interior of said casing to the exterior thereof and providing oppositely directed air discharge orifices through which air from said casing may be discharged, said valve means including a rolling member actuated in accordance with the direction of inclination of the spin axis of said rotor to determine which of said orifices will emit the air supplied thereto, whereby a precessing torque is applied to said gyro rotor by the air discharged therefrom.

14. In combination, a casing, a gyro rotor, means mounting said rotor in said casing, means mounting said casing and rotor for angular movement about two mutually perpendicular axes at right angles to the spin axis of said gyro rotor, means providing an air inlet to said casing for driving said rotor, means providing a plurality of air discharge orifices through which the air driving the rotor may be discharged from said casing, and rolling valve means actuated in accordance with the direction of angular movement of the spin axis of said rotor for determining which of said orifices will emit air therefrom for applying a precessing torque on said gyro rotor.

15. In a gyroscopic navigational instrument, a gyro wheel having a spin axis normally substantially vertical, a casing for the gyro wheel having a chamber with air-inlet and oppositely-directed air-exit orifices, a ball valve in said chamber adapted to open and close said exit orifices, respectively, upon inclination of the gyro spin axis from normal position, whereby upon departure of the gyro wheel axis from the true vertical and in accordance with the direction of tilt of the gyro spin axis, said ball valve rolls to close one and open the other exit orifice to apply a precessing torque to the gyro wheel through the resulting unbalanced air jet emerging from the open exit.

16. The combination with a gyroscope, of means including a single weight only brought into action by a disturbing force of limited magnitude about either of two mutually perpendicular horizontal axes of said gyroscope to produce a force for causing a torque to be applied to said gyroscope but completely ineffective to cause a torque to be applied to said gyroscope when said disturbing force exceeds said limited magnitude.

WESLEY L. SMITH.